INVENTOR.
MORGAN G. HUNTINGTON

INVENTOR.
MORGAN G. HUNTINGTON

BY
*Sughrue, Rothwell, Mion, & Zinn*
ATTORNEYS.

United States Patent Office 3,190,245
Patented June 22, 1965

3,190,245
APPARATUS FOR THE HEATING OF CARBONACEOUS MATERIALS BY THEIR PARTIAL COMBUSTION TO CARBON DIOXIDE
Morgan G. Huntington, Washington, D. C. assignor to Huntington Chemical Corporation, Salt Lake City, Utah
Filed Apr. 12, 1962, Ser. No. 186,920
2 Claims. (Cl. 110—28)

The combustion method and apparatus as disclosed and claimed herein is particularly useful for the generation of hydrogen and carbon monoxide gases from solid fuels and may be utilized as a combustion chamber in the apparatus shown in my copending application Serial No. 74,907 filed December 9, 1960 now Patent 3,088,816, of which this application is a continuation-in-part. Another application of the combustion method and apparatus would be for the continuous distillation of coal and hydrocarbonaceous materials such as, for example, disclosed in my copending application Serial No. 41,679, filed July 8, 1960 now Patent 3,017,985.

This invention relates to continuous partial combustion of carbonaceous materials in air and/or oxygen with carbon dioxide as the final gaseous product of such partial combustion. This invention particularly relates to an apparatus for heating char to a predetermined temperature by the partial combustion thereof, without producing any significant content of carbon monoxide in the final products of combustion.

This invention provides an apparatus for heating by partial combustion only a solid carbonaceous material to a high temperature in which as much as three-quarters of the total theoretical heat of combustion of carbon to carbon dioxide remains as sensible heat of the char and inerts and in which as little as one-fourth of the theoretical heat of the reaction leaves the system as sensible heat of the combustion gases.

This invention further provides for the selective apportionment of the heat of combustion of carbonaceous material between the sensible heat of the products of combustion and the sensible heat of partially consumed char and inerts over a wide range depending upon control of the reacting gas.

The term "solid carbonaceous material" infers coal, coke, carbon coated inerts, mixed carbon and inert material, etc.

In the partial combustion of solid fuels, such as occurs in front of the tuyeres of a blast furnace, for instance, a large part of the initial combustion product is carbon dioxide. However, in its passage through incandescent coke, essentially all of the carbon dioxide disappears within a few inches from the tuyeres in the reaction $CO_2 + C = 2CO$. Another example of the partial combustion of solid carbonaceous fuel is in the conventional intermittent blue water-gas generator system in which coke is alternately blasted with air and then with steam. Here the air blast is employed to partially burn the fuel bed in order to generate and to store heat in the solid fuel. The energy required to disassociate steam into hydrogen and carbon monoxide (blue water-gas) is furnished almost entirely by the sensible heat stored in the coke and every effort is made to produce as little carbon monoxide as is possible in generating and storing this heat. However, even under optimum operating conditions in known water-gas generators, some 20% of the calorific value of this solid fuel appears as net heating value of the carbon monoxide in the combustion or "blow run" gas.

In order to supply heat energy for water-gas generation as described above and for many other chemical reactions, numerous efforts have been made to heat carbonaceous fuel by its partial combustion with a minimum generation of carbon monoxide while blasting air and/or oxygen through fixed or fluidized beds. However, no known efforts have been rewarded with the production of essentially carbon dioxide in the combustion gases.

In those systems which are aimed at heating a corbonaceous fuel bed by its partial combustion, the exothermic heat generated per mol of carbon consumed is always more than 47,570 B.t.u. (generated by the reaction $C + \frac{1}{2}O_2 = CO$), but always substantially less than the 169,290 B.t.u. per mol, which is the total energy released when only carbon dioxide is produced ($C + O_2 = CO_2$). Obviously, it is desirable and certainly more efficient to produce the full 169,290 B.t.u. per mol of carbon, which is approximately the total thermal output when one mol of carbon is burned to carbon dioxide, rather than to produce only 28% of this when all carbon monoxide is produced from a single mol of carbon.

No previously known or practiced system has demonstrated the capability of continuously heating carbonaceous material by its partial combustion in air or in oxygen without generating a considerable proportion of carbon monoxide and thereby substantially wasting both carbon and oxygen. Further, shortcomings of all such systems which inadvertently generate two mols of carbon monoxide per mol of oxygen with a substantial portion of the combustion oxygen, rather than a single mol of carbon dioxide are these: (1) a disproportionate part (nearly eight times as much) of the sensible heat of reaction must leave the system as the very hot products of combustion; and (2) nearly four times more carbon and nearly twice as much oxygen is required for an equivalent amount of heat when burning carbon to CO rather than to $CO_2$.

In view of the foregoing, it is therefore a particular object of this invention to provide a means of heating solid carbonaceous materials by partial combustion without generating an appreciable proportion of carbon monoxide and whereby each mol of carbon will closely approach its full theoretical capability of producing 169,290 B.t.u. in combination with oxygen.

It is a further object of this invention to limit, when desirable, the percentage of the sensible heat of combustion of carbon in oxygen to that contained as sensible heat of carbon dioxide exiting at about 3,000° F. which would be approximately 23% of the total heat of reaction ($C + O_2 = CO_2$); and it is a further object of this invention to retain as much as 75% of the total heat of reaction as sensible heat of the partially burned solid fuel with any accompanying inerts.

Another object of this invention is to control the apportioning of the heat of formation of carbon dioxide, resulting from the partial combustion of solid fuel, so that the sensible heat of the combustion gases may be varied from as little as 23% of 169,290 B.t.u. per mol of carbon burned to well over 75% of the total heat of reaction through the dilution of the oxygen blast with nitrogen or some other nonreacting gas.

Other objects of this invention will be pointed out in the following description and claims and illustrated in the accompanying drawings, which illustrates by way of example the principle of the invention and the best mode In the drawings:

Certain exoethermic reactions ($C+\frac{1}{2}O_2=CO$—47,570 B.tu. and $C+O_2=CO_2$—169,290 B.t.u.), define the oxidation of carbon and the amounts of heat evolved. It is highly desirable for numerous applications, including that of generating water-gas, for the oxygen employed to be consumed by the reaction $C+O_2=CO_2$ because more heat is evolved per mol of carbon and less oxygen is required per unit of heat energy evolved. Unfortunately, at high temperatures in the presence of carbon the reaction $C+\frac{1}{2}O_2=CO$ will predominate, or to be more exact the reaction $C+CO_2=2CO$ occurs where the carbon dioxide involved combines with additional carbon to form carbon monoxide.

At usual gas making temperatures a number of different carbon-oxygen reactions will occur when oxygen is introduced into an ignited fuel bed and the net result will be the generation of heat amounting to between a minimum of 47,570 B.t.u. per mol of carbon oxidized by oxygen and less than 169,290 B.t.u. per mol. The actual amount of heat will depend upon various parameters including the temperature and depth of the fuel bed and the rate of oxygen introduction This invention provides a novel apparatus for oxidizing carbonaceous material by partial combustion, in which oxygen is introduced into a falling curtain of the carbonaceous material for producing as large a proportion of $CO_2$ as possible and as little $CO$ as possible thereby leaving a minimum of heat to be generated by the subsequent conversion of $CO$ to $CO_2$. A secondary combustion zone capped by a refractory cone positioned in the center of the falling curtain of carbonaceous material is provided with further means for oxygen injection for oxidizing the $CO$ to $CO_2$ and radiating the heat to the falling carbonaceous materials above the horizon at which oxygen is introduced into the cascading curtain.

Figure 1:
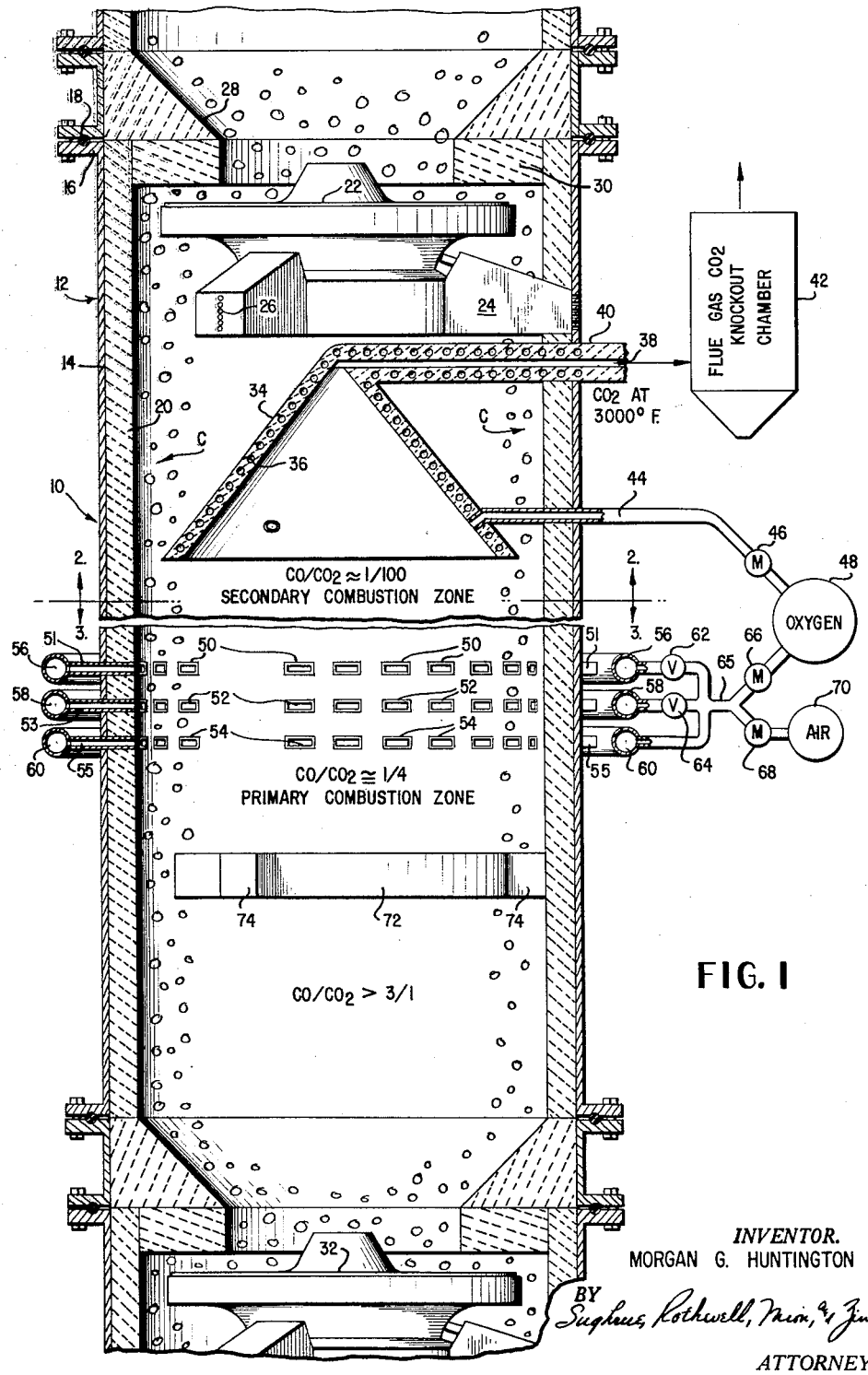
FIG. 1 is a side elevation view shown partially in section and partially schematic for the sake of clarity.
Figure 2:
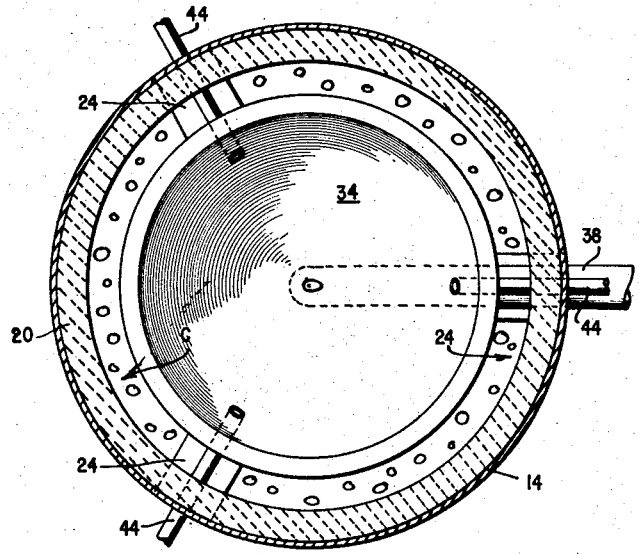
FIG. 2 is a sectional plan view taken along line 2—2 of FIG. 1.
Figure 3:
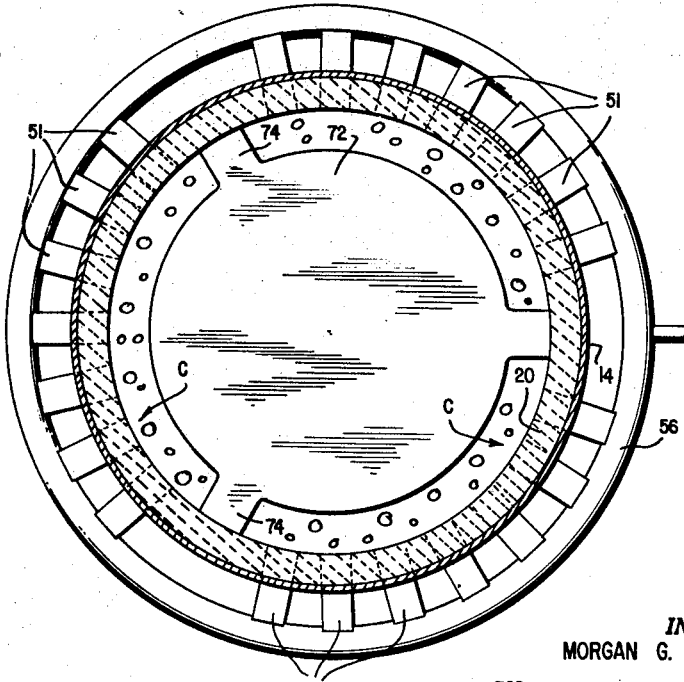
FIG. 3 is a sectional plan view taken along line 3—3 of FIG. 2.

The combustion apparatus of this invention may be a section of a vertical, gas separated, pressurized vessel as described in the abovementioned application. A combustion chamber section 10 (combustion zone) is shown in FIG. 1.

A vertical pressure vessel 12 containing the combustion chamber section 10 would include a suitable pressure shell 14 having flanges 16 and seals 18 for securing the vessel together in removable and variable length sections and would have a suitable refractory heat resistant lining 20. A gyratory feeder shelf 22 of the type disclosed and claimed in my copending application Serial No. 17,293, filed March 24, 1960 now Patent 3,083,471, is positioned to hold and feed in a controlled manner solid carbonaceous materials such as hot char or char and inerts over the periphery thereof. Since this gyratory feeder shelf is described in detail in the copending application, it will not be described in detail herein and reference may be had to the copending application for further details of the construction. The gyratory feeder shelf 22, is supported for its gyratory movement on a stationary support spider 24 carried by the pressure shell 14. The spider 24 may have a plurality of legs and these legs may include suitable coolant and lubrication passages 26. The refractory lining 20 may include a sloping wall 28 terminating in a liquid cooled steel impinging ring 30 immediately above the gyratory shelf to define the space available for the passage of the materials fed by the gyratory shelf as also disclosed in detail in my copending application Serial No. 17,293, filed March 24, 1960, now Patent 3,083,471.

A lower gyratory shelf 32 and other corresponding parts cooperating therewith including the support spider, sloping wall, impinging ring and the like is adapted to be positioned in the vertical pressure vessel below the combustion chamber section 10. The gyratory feeder shelves 22 and 32 support solid materials of a suitable density and depth to effectively separate or isolate the combustion chamber section 10 against gaseous diffusion and impede the flow of gases across the shelves to effectively gas isolate the combustion chamber section 10 from the remainder of the vessel.

Within the combustion chamber section 10 there is a refractory combustion cone 34 which has an effective inside diameter about seven-tenths of the total inside diameter of the pressure vessel shell thus making the effective area as great or greater than the area of the annular space outside the refractory cone. The inner surface of the refractory cone 34 will serve as an effective heat reflector and radiator at the high temperatures involved. For the purposes of cooling the combustion cone 34, suitable coolant passages 36 may be provided therein for the circulation of coolant. At the apex in the top of the cone 34 there is a mechanically cleaned offtake flue 38 also having water coolant passages 40 for suitable cooling purposes and this flue 38 may lead into a flue gas $CO_2$ knockout chamber 42.

Oxygen injecting tubes 44 are radially spaced around the periphery of the inside of the combustion cone 34 near the lower end thereof for the purposes of secondary combustion. The oxygen injected is controlled by suitable metering valves 46 from a source of oxygen 48.

Primary combustion takes place from the injection of oxygen, oxygen-air, or other oxidizer plus inert diluent mixture through three or more vertically displaced sets of tuyeres 50, 52, and 54. The tuyeres may be single slit or separate as shown and the oxidizer consisting of metered oxygen and air enters from manifolds 56, 58, and 60 through connecting conduits 51, 53, and 55 respectively. The oxygen is provided from the source of oxygen 48 and the air from the source of air 70 through metering valves 66 and 68 respectively; and then the oxidizer passes through the supply conduit 65 to the three sets of tuyeres 50, 52, and 54. Valves 62 and 64 control the oxidizer mixture to the tuyeres 50 and 52 in accordance with the desired combustion due to other parameters of the system including the particular carbonaceous material being used.

Below the primary combustion zone there is a turbulence arrestor plate 72 supported from the pressure vessel walls by a spider 74. This arrestor plate 72 may be suitably water cooled by means not shown if desired.

In the practice of the method and the operation of the apparatus an annular cascade of solid fuel C at a temperature sufficient to cause ignition in oxygen or air, with whatever inerts such as hot char, is fed off the periphery of shelf 22 in a controlled manner and falls down around the outside edges of combustion cone 34. This annular cascade of carbonaceous material forms practically a continuous curtain close to the walls of the combustion chamber. The combustion chamber section 10 is, as noted above, effectively gas sealed or at least sealed against substantial gas diffusion, and/or flow at either end by a regulated depth of solids formed by the carbonaceous material supported on the gyratory shelves 22 and 32.

Oxygen or oxygen and air is introduced in limited amounts radially through tuyeres 50, 52, and 54 and the time of contact between fuel and oxygen and initial $CO_2$ is limited in order to minimize the subsequent formation of $CO$. The annular cascade is in effect a very thin fuel bed and the oxidizer passes transversely therethrough in the primary combustion function. Because the cascading fuel fragments are falling relatively rapidly across the faces of the tuyere, localized combustion hot spots will not exist. The oxygen from source 48 may be supplemented by air or other inerts from source 70. The portion of inert gas (nitrogen) in the air injected with the combustion oxygen is for the purpose of proportionately increasing the sensible heat of the combustion gases as may be needed for subsequent heat exchange. The primary tuyere breast consisting of the tuyeres 52 and 54 allows the injection of measured amounts of oxygen into the cascading curtain of finely divided fuel. Whether all of the metered oxidizer gas is injected through a single set of tuyeres such as 54 or is injected through several superposed slots such as 50 and 52 as well as 54 at a lower velocity is a function of combustion gas analysis. Under some conditions, enough oxygen may be injected through the primary tuyeres to cause some excess oxygen inside the annular cascade and also eliminate the need for secondary oxidizer gas injection through the other tuyeres. Since the objective of the primary injection of oxidizer gas is to form as much as $CO_2$ and as little CO as possible, this leaves a minimum of heat to be generated by secondary combustion of whatever carbon monoxide remains to carbon dioxide. The primary combustion accomplished by this primary injection of oxidizer gas will of course occur at and below the breasts of tuyeres in a "primary combustion zone" where the ratio of CO to $CO_2$ may be approximately one-fourth.

Secondary combustion as practiced by this invention is for the purpose of oxidizing whatever carbon monoxide is generated in the primary combustion phase to carbon dioxide. This secondary combustion is accomplished immediately below and in the combustion cone 34 in a "secondary combustion zone" by the secondary injection of oxygen through passages 44. The ratio of CO to $CO_2$ is approximately one one-hundredth in this secondary combustion zone. This secondary combustion of CO to $CO_2$ is possible because practically no solid fuel is present. The combustion cone 34 serves a number of purposes in that it separates the solid cascade of fuel C from the secondary combustion zone, which is that region within and immediately below the refractory-lined cone. The cone 34 also serves as a radiation surface to reflect or radiate heat from the secondary combustion process back against the solid fuel curtain cascading adjacent the refractory walls to preheat the curtain which absorbs the radiated heat prior to the primary injection of oxygen through the tuyere breasts 50, 52, and 54. Furthermore, the hot inner surface of the refractory cone 34 promotes surface catalysis in the final scavenging reaction between CO and $O_2$ and radiates much of this heat so generated back again to the annular fuel curtain. This hot surface also provides continuity and uniform ignition and combustion of CO to $CO_2$.

The secondary combustion to the triatomic molecule $CO_2$ will cause a large amount of heat to be radiated. This radiation will be partially absorbed by the cooler falling curtain of carbonaceous material to thereby preheat the same prior to the primary combustion and above the breast of tuyeres. Also, the temperature of inner surface of the combustion cone must necessarily be on the order of 3000° F., and therefore substantially hotter than the annular curtain of cascading fuel. Thus, the high temperature radiating surface and temperature differential will allow a substantial amount of heat to be radiated from the combustion cone 34 to the curtain of cascading fuel above the primary combustion horizon to further accomplish heat conservation by preheating prior to primary combustion. The temperature in the secondary combustion zone is self-limiting due to the radiation to the much cooler absorber which is the solid fuel curtain. Moreover, this solid curtain effectively screens the walls from radiant heat. The temperature in the secondary combustion chamber will be in the order of 3000°.

The turbulence arrestor plate 72 is for the purpose of arresting turbulence of the annular curtain of cascading fuel falling on the separating bed supported by gyratory shelf 32. This prevents an excessive amount of solid carbonaceous materials from boiling up into the secondary combustion zone. Such turbulence arrestor plates are also for the purpose of defining the annular path of gases through which the solid fuel cascade must fall. Below the turbulence arrestor plate 72 the ratio of CO to $CO_2$ is a function of the equilibrium constant at the temperature, e.g., $CO/CO_2 > 3/1$.

The products of combustion leaving the secondary combustion zone through the offtake flue 38 at the vertex of the cone will be at a temperature in the order of 3000° F. and will include very little excess oxygen. The heat leaving the system as sensible heat of the flue gases, therefore, may represent as little as 23% of the total heat of combustion realized in burning carbon to carbon dioxide. Including 6 or 7 percent of the heat of reaction of carbon to carbon dioxide as losses to cooling water and to surrounding through the refractory lining there remains a net realization in the order of 70% of the heat of reaction as sensible heat absorbed by the descending solid fuel and ash or other inert material. However, if it is desired to have a large proportion of the sensible heat in the flue gases, for example, if the flue gases are to be used for drying, preheating or other heat exchange purposes, it is only necessary to regulate the amount of air and thereby vary the inert gas content of the combustion products.

It is contemplated that in the apparatus of this invention, combustion will take place at a pressure of 20 atmospheres plus or minus 10 atmospheres although the inventive concept and the operation of the invention is not limited to these rather modest extremes of pressure. However, as noted in my copending application Serial No. 74,907, increased pressure will tend to move the equilibrium curves for carbon monoxide and carbon dioxide toward increased temperatures. In other words, equilibrium temperatures are about 400° higher at 20 atmospheres than at one atmosphere. It will be seen that the temperatures of secondary combustion are high enough that the approximate 400° F. rise in equilibrium temperature is of some practical consequence and assists in reducing the tendency of disassociation of carbon dioxide to carbon monoxide and oxygen at higher flame temperatures.

While there has been shown and described and pointed out the fundamental novel features of the invention as applied to a preferred embodiment, it will be understood that various omissions and substitutions and changes in the form and detail of the device illustrated and in its operation may be made by those skilled in the art without departing from the spirit of the invention. It is the intention, therefore, to be limited only as indicated by the scope of the following claims.

What is claimed is:
1. An apparatus for controlled partial combustion of solid carbonaceous fuel to carbon dioxide comprising:
  (a) a pressurized vertical vessel,
  (b) means for gas isolating at least a portion of the vessel,
  (c) gyratory feed means for feeding hot solid carbonaceous fuel continuously downward through the vessel adjacent the walls thereof as an annular cascade,
  (d) means for introducing controlled amounts of oxidizer gas and inert gas through the side walls of the vessel into the annular cascade of solid fuels at a predetermined horizon for primary combustion.
  (e) a conically-shaped secondary combustion member positioned above the horizon of the oxidizer gas introducting means and open toward the bottom of the combustion chamber defining a secondary combustion zone therein and therebelow for the combustion of carbon monoxide to carbon dioxide,
  (f) means for introducing oxygen through the conically shaped secondary combustion member for burning carbon monoxide in the secondary combustion zone to carbon dioxide and allowing the heat to be radiated on to the annular cascade of solid fuel,

(g) a turbulence arrestor plate positioned below the level of the oxidizer gas introducing means and aiding the conical shaped secondary combustion member in preventing solid carbonaceous fuel from entering in a space within the annular curtain cascade above the level of the oxidizer gas introducing means, (h) and a passageway in the apex of the conically-shaped combustion member for withdrawing the products of combustion.

2. An apparatus as defined in claim 1 further comprising liquid cooling means for the conically-shaped secondary combustion member and for the turbulence arrestor plate.

References Cited by the Examiner

UNITED STATES PATENTS

| | | | |
|---|---|---|---|
| 2,038,657 | 4/36 | Hillhouse | 48—197 |
| 2,582,710 | 1/52 | Martin | 263—52 |
| 2,638,684 | 5/53 | Jukkola | 263—21 X |
| 2,735,880 | 2/56 | Begley et al. | 23—288.3 |

JAMES W. WESTHAVER, *Primary Examiner.*

JOHN J. CAMBY, *Examiner.*